March 7, 1967     S. M. BLANK     3,307,868
ENERGY ABSORBING VEHICLE BUMPER ASSEMBLY
Filed Oct. 22, 1965     2 Sheets-Sheet 1

INVENTOR.
STEWART M. BLANK
BY *Michael M. Schulte*
AGENT

March 7, 1967 S. M. BLANK 3,307,868
ENERGY ABSORBING VEHICLE BUMPER ASSEMBLY
Filed Oct. 22, 1965 2 Sheets-Sheet 2

INVENTOR
STEWART M. BLANK
BY
Michael M. Schuster
AGENT.

United States Patent Office 3,307,868
Patented Mar. 7, 1967

3,307,868
ENERGY ABSORBING VEHICLE BUMPER
ASSEMBLY
Stewart M. Blank, 4634 Manhattan Beach Blvd.,
Lawndale, Calif. 90260
Filed Oct. 22, 1965, Ser. No. 507,626
12 Claims. (Cl. 293—70)

This application is a continuation-in-part of applicant's co-pending applications; having the subject matter disclosed in Serial Number 328,880, filed December 9, 1963, now abandoned; containing some of the subject matter disclosed in Serial Number 432,736, filed February 15, 1965, now Patent No. 3,268,256, issued August 23, 1966, and disclosing additional subject matter in this application.

This invention relates to safety bumper devices for vehicles.

This invention provides a device which will absorb the energy of impact during a collision by yielding and deforming under shock load.

An object of this invention is to provide a safety bumper which will yield under the shock of impact in a collision and so absorb energy.

A further object of this invention is to provide a safety bumper for vehicles which will have members that will deform permanently in order to absorb the energy of shock in a collision.

Still a further object of this invention is to provide deformable members which will absorb the shock of a collision by permanent deformation but will still be capable of easy replacement for maintenance after the permanent deformation occurs in a collision.

A further object of the invention is to provide a safety bumper which can be applied to land, sea or air vehicles by adjusting deformation capability of the energy absorbing deformable members of the safety device, to provide for the predicted impact loads that might be encountered by the vehicle due to its projected size, weight and speed.

Still another object of the invention is to provide deformable members in a safety bumper which will fail progressively at varying strain rates, to provide a cushion impact under the first shock of collision and will gradually intensify resistance to the increased collision load as the energy of the collision impact increases to a peak before cessation of movement or the start of rebound.

Still a further object of this invention is to provide a safety bumper for vehicles with a shock absorber that will be self-guiding to prevent malfunction due to eccentric impact loads.

A full understanding of the aforementioned objects of the invention and of further objects and advantages as well as those cited will be gained by reference to the following description and accompanying drawings in which.

Figure 1:
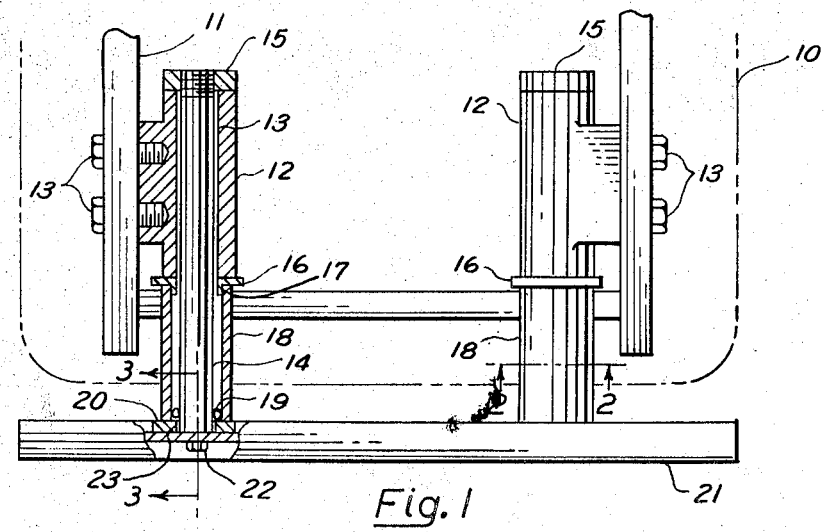
FIG. 1 is a top plan view of the safety bumper shown attached to a fragmentary view of a truck frame, with the body outline of the truck shown in phantom.
Figure 2:
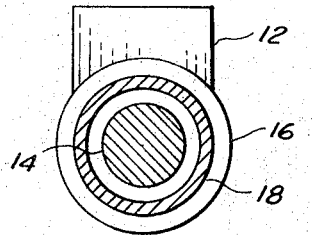
FIG. 2 is a fragmentary sectional view taken on line 2—2 of FIG. 1.
Figure 3:
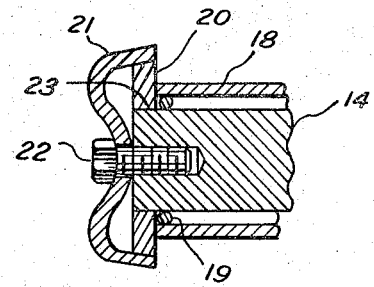
FIG. 3 is a fragmentary sectional view taken on line 3—3 of FIG. 1.

Although this invention is not limited to automotive vehicles as it may be applied to fenders or bumpers to any vehicle subject to collision shock, such as fenders on a boat, FIG. 1 illustrates the invention as it would be utilized on a truck body.

In FIG. 1 the front end of a truck 10 is shown in phantom. A segment of the truck frame 11 has the shaft mounting brackets 12 bolted to it with studs 13, the shaft mounting brackets 12 have a bore 13 through which the bumper mounting shafts 14 are slidably assembled and restrained from forward motion by threaded caps 15. Rings 16 are slidably mounted on the bumper mounting shafts 14 and have a reduced diameter 17 which locates the impact tubes 18 with equal radial spacing around bumper mounting shafts 14. The other end of the impact tubes 18 are radially spaced from the bumper mounting shafts 14 by the resilient rings 19. Reaction plates 20 abut the end of the impact tubes 18 and the inside surface of bumper 21. The bumper 21 is attached to the bumper mounting shafts 14 with bolts 22 running through the bumper into tapped holes in the bumper mounting shafts 14. The reaction plates 20 have clearance holes 23 to provide for slidable fit with the bumper shafts 14.

Figure 4:
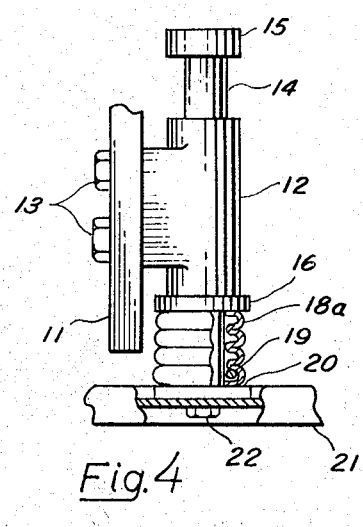
FIG. 4 is a fragmentary top plan view in partial cross-section of the safety bumper shown in FIG. 1 with parts shown in their translated position after impact load.

In a minor collision which would not exceed the impact load capacity of the maximum strength of the impact tubes 18 the bumper 21 would act as a conventional automotive bumper to absorb shock. Under heavier impact load which would exceed the yield strength as a column of the impact tubes 18, the bumper 21 would push back on bumper mounting shafts 14 which are slidably mounted in the shaft brackets 12 and the impact tubes 18 would collapse in the manner shown in FIG. 4, as shown by collapsed tube 18a, failing as a column to the extent necessary to absorb the energy of the impact.

Figures 5, 6:
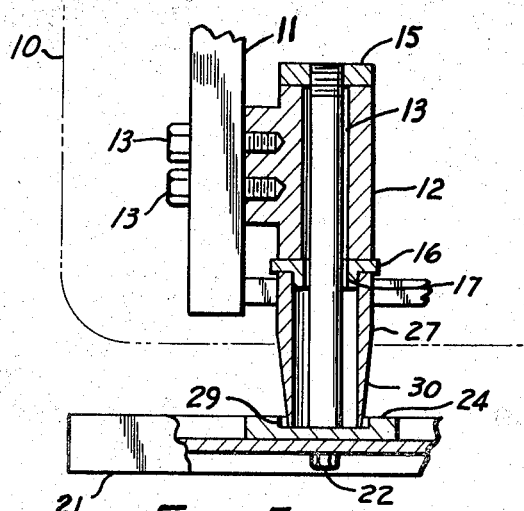
FIG. 5 is another embodiment of the invention illustrated in FIG. 1.
FIG. 6 is another embodiment of the energy absorbing deformable member of the invention shown in FIG. 1.

Since it is recognized that the sharpest impact load on the occupants of a vehicle would be at the beginning of the collision time in any rigid system an improved embodiment of this invention is shown in FIG. 5. The reaction plate 24, as shown in this embodiment as a counter bore 29, which confines and locates the end of impact tube 27 concentric to the mounting shaft. The impact tube 27 in FIG. 5 is tapered at one end, 30, so that deformation failure will begin at a lower load at the instant of impact and energy will be dissipated during the first minute intervals of time of the total collision time, and the dissipated energy will gradually build to meet the peak values of shock energy as the tapered area yields under the load and the load is gradually transferred into the heavier sections where further deformation occurs to absorb the remaining energy of the impact load. A further advantage of this embodiment provides protection at low speed collisions which can produce injuries or damage in a manner similar to high speed collision.

In tests to prove the effectiveness of the tapered impact sleeve 27, a specimen approximately 10 inches long as prepared having one end tapered from the outside diameter of 2 inches with a wall thickness of .125 to a wall thickness of .065 at the end for a distance of 2¾ inches. Specimen 1 was made of 6061-0 Aluminum Alloy and Specimen 2 was made of 6061-T4 Aluminum Alloy. The results of the tests were as follows for compression load to fail the member:

| Fold | Specimen 1 | Specimen 2 |
|---|---|---|
|  | Lbs. | Lbs. |
| 1 | 7,600 | 11,100 |
| 2 | 10,340 | 17,000 |
| 3 | 10,830 | 24,100 |
| 4 | 12,700 | 28,900 |
| 5 | 14,100 | 29,500 |
| 6 | 15,040 | 31,100 |
| 7 | 16,200 | 35,500 |
| 8 | 16,800 | 35,000 |
| 9 | 17,700 |  |

It can be seen that a smaller initial impact load will produce failure until the uniform section is reached and then the resistance increases sharply until it reaches a fairly uniform rate of increase and a final leveling off of resistance load.

The deformable member 35 shown in the embodiment of FIG. 6 would achieve an effect similar to the embodiment of FIG. 5 by the utilization of reduced diameters 37 and 39.

One of the advantages of this invention is that after an impact in which the impact tubes 18 are collapsed, the impact tubes 18 may be replaced very easily by removing bolts 22 and demounting bumper 21. The reaction plates 20 may then be slipped off of bumper mounting shafts 14. The collapsed tubes 18 may then be removed and new impact tubes 18 intsalled by slipping the bumper mounting shafts 14 forward, reinstalling new impact tubes 18 and replacing reaction plates 20 over the bumper mounting shafts 14 after sliding the bumper mounting shafts 14 forward, then rebolting bumper 21 to bumper mounting shafts 14 with bolts 22. The tubes 18 may be made of any material suitable to absorb the anticipated loads of impact for a particular vehicle and its cross-sectional area may be varied to establish the load capability.

Figure 7:
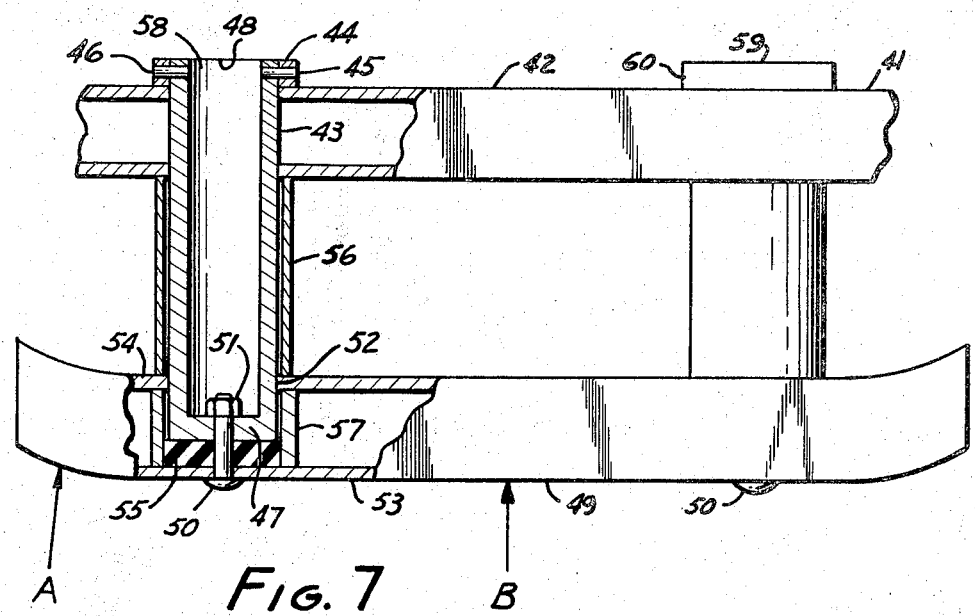
FIG. 7 is a plan view, partially in cross-section of another embodiment of the invention.

Another embodiment of the invention is shown in FIG. 7. A truck frame 41 has mounting shaft 43 slidably mounted to frame member 42. Flange 44 is mounted to mounting shaft 43 and may be conveniently pinned with drive pins 45 and 46. Flange 44 prevents mounting shaft 43 from sliding forward through frame member 42. Mounting shaft 43 may be conveniently made of tubular construction with a first end 47 closed off and the second end 48 open. A bumper 49 is mounted to mounting shaft 43 and held in position by bolts 50 and nuts 51. The bumper may be conveniently made in a box section configuration and has an opening 52 to receive bumper mounting shaft 43. The bumper 49 has an impact receiving face 53 and an impact transmitting face 54. Interposed between the closed end 47 of mounting shaft 43 and the impact receiving face 53 of bumper 49 is an elastomeric impact member 55. A deformable member called an impact tube 56 is placed around bumper mounting shaft 43 coaxial with the bumper mounting shaft 43 between the impact transmitting face 54 of bumper 49 and the frame member 42. The impact tube 46 may have the configuration of the impact tubes 18 of FIG. 1 or impact tube 27 of FIG. 5 or impact tube 35 of FIG. 6. A guidance member 57 is fixed within bumper 49 coaxially with the mounting shaft 43.

In a conventional collision, when an impact force shown as B is encountered between the shock absorbing members, the action of the safety bumper 49 will be much the same as described hereinbefore for the other embodiments of the invention, with the exception that the elastomeric member 55 may smooth out minor impacts by elastic deformation. However, when a load is encountered, such as force A shown in FIG. 7, which is eccentric to the placement of the shock absorbing members, the advantages of this embodiment of the invention become apparent. The eccentric force A will cause compression on one side of elastomeric member 55. This would tend to load the bumper unevenly and prevent the shock absorber assemblies 58 and 59 from distributing the shock between themselves since the moment arm of force A around shock absorber 58 would tend to pull the bumper away from shock absorber 59 and place a load upon retaining flange 60 of shock absorber 59. However, due to the guidance imposed by guidance member 57 around mounting shaft 43, the elastomeric member would deflect until enough pressure is built up to deform impact tube 56, which will start to deform locally on the side closest to force A but, due to the guidance of guidance member 57, the impact tube 56 will distribute its load around its circumference during the process of failure as the elastomeric member 55 deforms and then transfers load throughout its section. This action of local deformation of elastomeric member 55 and distribution of the deformation load around the impact tubes 56 will continue until the entire force of the impact force A is absorbed. Since the bumper is held straight by the guidance member 57 a part of force A will be distributed to the shock absorber assembly 59.

It is to be understood that the described invention that has been shown as applied to the front bumper of a truck in the example would also be applied to the rear bumper to absorb rear end collisions. On boats and barges it might be applied to the fenders on the side, stern or bow. Airborne vehicles, such as helicopters, might have such bumpers applied to landing apparatus such as wheels or skids.

It is to be understood that the scope of this invention is not limited by the typical description of the applications given but may be varied to accomplish other objects, advantages and embodiments that come within the scope of the appended claims.

I claim:

1. A safety bumper system for vehicles which comprises: bumper means; a multiplicity of shock energy absorbers, each of said shock energy absorbers including a mounting bracket, said mounting bracket adapted to be attached to the structure of a vehicle, a bumper mounting shaft, said bumper mounted on one end of said shaft, said shaft slidably mounted in said mounting bracket, mechanical stop means on the other end of said shaft, said mechanical stop means adapted to prevent sliding of said bumper mounting shaft in the direction of said bumper, a deformable member, said deformable member mounted between said mounting bracket and said bumper means, said deformable member of tubular configuration, said tubular configuration having a wall thickness with a dimensional ratio to the diameter and length of said tubular deformable member adapted to produce a columnar buckling failure, said deformable member mounted concentrically over said bumper mounting shaft thus preventing sliding motion of said bumper mounting shaft until the yield strength of said deformable member is exceeded in shock energy.

2. Apparatus as described in claim 1 which includes said bumper means removably mounted on said bumper mounting shaft and adapted to permit replacement of said deformable member after deformation occurs.

3. A safety bumper for a vehicle which comprises: a bumper; a pair of mounting brackets, said mounting brackets adapted to be attached to the frame of a vehicle; a pair of bumper mounting shafts, said bumper mounting shafts slidably mounted in said mounting brackets; said bumper mounted on one end of said shafts, mechanical stop means, said mechanical stop means mounted on the other end of said shafts, said stop means adapted to prevent sliding of said bumper mounting shafts in the direction of said bumper; a pair of deformable members, said deformable members of tubular shape, said tubular shape of said deformable members being externally cylindrical for a portion of their length with constant wall thickness and a varying wall thickness for the remainder of their length, all of said thicknesses having a ratio of thickness to tubular diameter to length of said deformable member which will produce columnar buckling failure, said deformable members mounted between said mounting brackets and said bumper concentric to said bumper mounting shafts, said deformable members adapted to fail in compression under a load which increases proportionately with deformation distance for at least one portion of the total deformation distance capability of the deformable member, said deformable members installed concentrically over said bumper mounting shafts to prevent sliding motion of said bumper mounting shafts until the yield strength of said deformable member is exceeded under loads imposed.

4. Apparatus as described in claim 3 which includes said deformable members in the shape of tubes, said tubes having a first end and a second end, said first end having the external shape of the frustrum of a cone for a portion of the total length of said tubular deformable members, said conical shape being co-axial with said tubular member, and said tubular member having an internal surface of constant diameter, said tubular deformable members mounted concentrically of said bumper mounting shafts between said bumper and the frame of a vehicle.

5. Apparatus as described in claim 3 which includes said deformable members in the shape of tubes, said tubes having a first end and a second end, said tubular deformable member having an external shape which includes a plurality of concentric, cylindrical surfaces diminishing in diameter from said second end to said first end.

6. Apparatus as described in claim 3 which includes said bumper adapted to be demounted from said bumper mounting shafts for ready replacement of said deformable members after deformation.

7. In combination with a vehicle frame, a bumper assembly which comprises:
(a) a pair of bumper mounting shafts, said bumper mounting shafts slidably mounted to said vehicle frame, said bumper mounting shafts having a first end and a second end;
(b) a bumper, said bumper mounted to said first end of said bumper mounting shafts;
(c) a pair of deformable members, said deformable members interposed between said bumper and said vehicle frame, said deformable members of tubular shape, said tubular shape being externally cylindrical with constant wall thickness for a portion of its length and of varying wall thickness for the remainder of its length, all of said thicknesses having a ratio of wall thickness to tubular diameter to length of said deformable member which will produce columnar buckling failures; said deformable members concentrically mounted on said bumper mounting shafts;
(d) a pair of elastomeric members, said elastomeric members interposed between said first end of said bumper mounting shafts and said bumper;
(e) a pair of shaft stop means, said shaft stop means mounted to said second end of said bumper mounting shafts to prevent said bumper mounting shafts from sliding out of said vehicle frame;
(f) bumper guidance means, said guidance means adapted to maintain the angular relationship of said bumper to said bumper mounting shafts under an eccentric impact load.

8. Apparatus as described in claim 7 which includes said deformable members in the shape of a tube, said tubular deformable members having a tapered external surface for a portion of their length, said tapered external surface adapted to provide a varying cross-section to said tubular deformable members and adapted to cause said tubular deformable members to fail in compression under a load which increases proportionately with deformation distance, said tubular deformable members co-axial with said bumper mounting shafts.

9. Apparatus as described in claim 8 which includes said guidance means of tubular construction, said tubular guidance means co-axial with said bumper mounting shafts, said tubular guidance means mounted to said bumper and adapted to contain said elastomeric members between said first end of said bumper mounting shafts and said bumper.

10. Apparatus as described in claim 7 which includes said deformable members of tubular construction, said tubular deformable members co-axial with said bumper mounting shafts, said tubular deformable members having external, stepped diameters to provide varying cross-sectional areas adapted to fail under a different load rate for each given increment of length and diameter.

11. Apparatus as described in claim 10 which includes said guidance means of tubular construction, said tubular guidance means co-axial with said bumper mounting shafts, said tubular guidance means mounted to said bumper and adapted to contain said elastomeric members between said first end of said bumper mounting shafts and said bumper.

12. Apparatus as described in claim 7 which includes said guidance means of tubular construction, said tubular guidance means co-axial with said bumper mounting shafts, said tubular guidance means mounted to said bumper and adapted to contain said elastomeric members between said first end of said bumper mounting shafts and said bumper.

References Cited by the Examiner

UNITED STATES PATENTS

| | | | |
|---|---|---|---|
| 1,548,087 | 8/1925 | Heller | 293—85 |
| 1,579,186 | 3/1926 | Weiland | 293—88 |
| 1,739,236 | 12/1929 | Jandus | 293—85 X |
| 2,135,749 | 11/1938 | Gullo | 293—85 X |
| 2,251,347 | 8/1941 | Williams et al. | 213—221 |
| 2,335,340 | 11/1943 | Koppelman | 297—216 X |
| 2,682,931 | 7/1954 | Young | 188—1 |
| 2,870,871 | 1/1959 | Stevinson | 188—1 |
| 2,933,127 | 4/1960 | Brewster | 297—216 |
| 2,959,207 | 11/1960 | Brewster | 297—216 |
| 2,971,566 | 2/1961 | Negroni | 297—302 |
| 2,997,325 | 8/1961 | Peterson | 293—86 X |
| 3,001,815 | 9/1961 | Weber | 293—1 X |
| 3,006,484 | 10/1961 | Pringiers | 213—220 |
| 3,059,966 | 10/1962 | Spielman | 297—216 |
| 3,068,039 | 12/1962 | Barenyi | 293—88 X |
| 3,081,119 | 3/1963 | Dison | 293—48 |
| 3,112,955 | 12/1963 | Stolz | 297—216 |
| 3,146,014 | 8/1964 | Kroell | 293—86 X |

FOREIGN PATENTS 363,658   12/1931   Great Britain.

References Cited by the Applicant

"Packaging a Delicate Payload," Machine Design, June 9, 1966.

ARTHUR L. LA POINT, *Primary Examiner.*

H. BELTRAN, *Assistant Examiner.*